United States Patent [19]

Kaell et al.

[11] Patent Number: 5,715,272
[45] Date of Patent: Feb. 3, 1998

[54] DEVICE FOR CHARGING AN ELECTRIC FURNACE

[75] Inventors: Norbert Kaell, Differdange, Luxembourg; Daniel Fries, Arlon, Belgium; Serge Devillet, Buerden, Luxembourg

[73] Assignee: Paul Wurth S.A., Luxembourg

[21] Appl. No.: 663,174

[22] PCT Filed: Nov. 30, 1994

[86] PCT No.: PCT/EP94/03970

§ 371 Date: Aug. 26, 1996

§ 102(e) Date: Aug. 26, 1996

[87] PCT Pub. No.: WO95/16796

PCT Pub. Date: Jun. 22, 1995

[30] Foreign Application Priority Data

Dec. 15, 1993 [LU] Luxembourg ................. 88440
Jul. 20, 1994 [LU] Luxembourg ................. 88517

[51] Int. Cl.$^6$ ........................................... F27D 3/00
[52] U.S. Cl. .................... 373/79; 373/115; 373/73; 75/414; 75/10.61; 266/45
[58] Field of Search ................... 373/79, 81, 78, 373/71, 80, 115, 73; 266/45, 165, 236, 900; 75/414, 10.61, 560, 573, 584

[56] References Cited

U.S. PATENT DOCUMENTS

| 3,674,903 | 7/1972 | Bintzer ........................... 373/79 |
| 5,153,894 | 10/1992 | Ehle et al. ........................ 373/80 |
| 5,238,484 | 8/1993 | Pirklbauer et al. ................. 75/414 |

*Primary Examiner*—Tu B. Hoang
*Attorney, Agent, or Firm*—Fishman, Dionne, Cantor & Colburn

[57] ABSTRACT

Charging device for supplying liquid metal to an electric furnace with a shaft 15, the device consisting of a balcony 19 extending the shaft 15 of the furnace 10 laterally and communicating with the hearth of the furnace 10.

8 Claims, 4 Drawing Sheets

DEVICE FOR CHARGING AN ELECTRIC FURNACE

BACKGROUND OF THE INVENTION

The invention relates to a device for charging an electric furnace with a molten metal.

A large part of the recycling of scrap iron is achieved using electric furnaces such as arc furnaces. These furnaces make it possible to melt and reuse the scrap iron treated in this way in order to make new steel products such as girders, etc.

Some of the residual elements contained in the scrap iron, such as copper, nickel, etc., cannot be separated from the steel and are therefore present in the finished products. The more the scrap iron has been subjected to recycling operations, the higher will be the concentration of these residual elements. The latter are a nuisance in the manufacture of certain products such as steel sheets, etc.

One way of reducing the concentration of residual elements in the steel obtained from scrap iron is to add some liquid iron directly to the electric furnace. This method necessitates the removal of the cover of the electric furnace. It is therefore necessary to interrupt the process of melting the scrap iron, to move the cover and to pour the liquid iron into the electric furnace over the partially melted scrap iron. During this operation, large quantities of dust are released into the atmosphere and part of the iron or the partially melted steel is ejected from the furnace. Furthermore, the impact of the liquid iron risks damaging the cooling panels lining the inside of the furnace. It is clear that this method is insalubrious, dangerous and reduces the productivity of the furnace.

SUMMARY OF THE INVENTION

The aim of the present invention is to put forward a device avoiding to damage the furnace by projections of cast iron during the introduction of liquid cast iron and to minimize the loss of heat.

According to the present invention, this aim is achieved by a charging device intended to supply liquid metal to an electric furnace with a hearth, said device comprising a balcony extending the furnace hearth laterally said balcony being covered internally with a coating of a refractory material.

The device is characterized by a cover, equipped with a refractory coating, located above said balcony, said cover forming in an open position a protection shield for a part of the furnace (10) adjacent to the said device.

In the charging device according to the invention, the iron is no longer poured directly into the shaft of the electric furnace (e.g. from a ladle), but is introduced by a projecting lateral balcony communicating with the hearth of the electric furnace. There is consequently no longer any need to remove the furnace cover and interrupt the process of melting the scrap iron during the introduction of the molten metal. The productivity of the furnace is increased since the charging with iron is carried out while the plant is running. The working life of the cooling panels in the furnace shaft is increased since the iron is no longer thrown against these panels during the charging.

Moreover, emissions of dust into the atmosphere are limited since the liquid iron comes into contact with the scrap iron below the cover of the electric furnace. Consequently, the dust that is created is sucked away and dealt with by the furnace filtration system.

In addition, the refining of the molten metal may be initiated by the injection of oxygen from the beginning of the production cycle.

The inner surface of the said balcony is entirely covered by a refractory material in order to protect the balcony against the heat from the liquid iron. Preferably, the bottom of the balcony is faced with an impact plate made of a special refractory in order to prevent its premature wear.

It will also be appreciated that the supply balcony incorporates a cover fitted with a lining made of a refractory material which minimises heat losses and which forms a protective shield for a part of the furnace adjacent to the said device when it is open. In this way, the furnace is protected against ejections of liquid iron during the charging.

Preferably, the lateral supply balcony will be positioned near the tap hole. This arrangement has the advantage that the door of the furnace can remain closed during the addition of the liquid iron. Standard operations carried out through the door are not hampered.

In order to prevent the liquid iron from running directly from the lateral balcony into the tap hole and thus complicating the operation of pouring in the ladle, a flow channel may be made in the refractory from the hearth of the lateral balcony to the centre of the furnace.

If necessary, a raised section or a mound may be positioned between the flow channel and the tap hole so as to deflect the iron from the tap hole.

The positioning near the tap hole of the balcony used for charging the furnace with iron and the possibility of pouring a precise amount of iron also allow part of the liquid metal contained in the ladle to be poured directly into the steel-casting ladle intended to receive molten steel coming from the furnace with the aim of slightly altering this steel. In this way, energy is saved and the alloying elements (C, Mo, Si) are recovered.

According to an advantageous embodiment, a barrier is located between the balcony and the shaft of the electric furnace which has the effect of creating, in the lower part of the balcony, a bottom filled with molten metal during the whole of the time when the iron is being poured into the lateral balcony. In this way, the ejections of liquid iron during the pouring are limited.

The barrier is preferably detachable. It may then be easily replaced when it is worn.

Advantageously, the barrier has one or more openings made in the base of the said barrier in order to allow the said balcony to be emptied after the furnace has been charged with the iron.

Additional advantages and characteristics will emerge from the detailed description of advantageous embodiments of the invention given below, solely as illustrative examples, with reference to the appended drawings, in which:

DESCRIPTION OF THE PREFERRED EMBODIMENT

Figure 1:
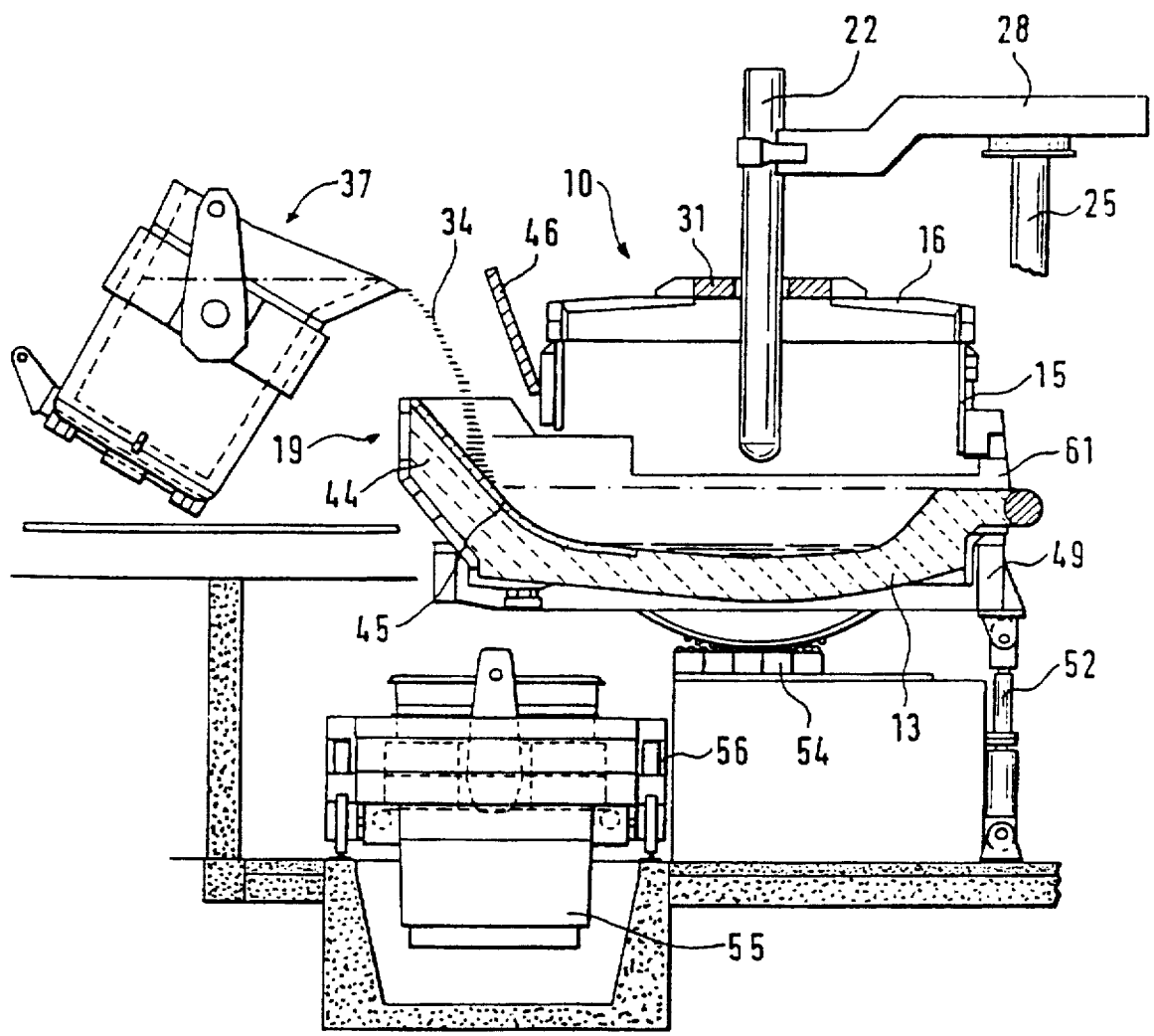
FIG. 1 is a longitudinal cross-section through an electric furnace incorporating a charging device for liquid iron.

FIG. 1 shows an electric furnace 10 comprising a hearth 13 made of a refractory material surmounted by a shaft 15 and a cover 16 together with a lateral balcony 19 or charging spout for supplying liquid iron to the furnace 10.

In order to charge the furnace with scrap iron, the cover 16 is removed and the scrap iron is then poured into the furnace shaft. When the shaft 15 is filled with scrap iron, the cover 16 is replaced on the shaft 15 and at least one electrode 22 mounted on a supporting post 25 by means of an arm 28, is introduced into the furnace 10 through an opening 31 made in the cover 16. The arm 28 may slide on the supporting post 25 so that it can ascend and descend with the electrode 22.

A hot-metal ladle 37 is positioned near the lateral balcony 19 by means of a crane or a tilting carriage (not shown). The ladle 37 is inclined and the liquid iron 34 is poured into the lateral balcony 19.

The lateral balcony 19 is fitted with a lining composed of a refractory material 44 and its bottom is faced with an impact plate 45 made of a special refractory so as to protect the balcony 19 against wear.

A cover 46 limits the heat loss from the furnace through the balcony 19. The cover 46, when open during the loading of the liquid iron into the furnace, protects the furnace against ejections of the liquid iron 34.

The furnace 10 is mounted on a cradle 49 enabling it to be tilted by means of a hydraulic actuator 52. When the actuator 52 is retracted, the cradle 49 and the furnace 10 tilt on their tilting seat 54 located below the cradle 49. The furnace is balanced so that it returns to a horizontal position even if the hydraulic circuit supplying the actuator 52 breaks down.

When the scrap iron has melted, the liquid steel is poured into a steelcasting ladle 55 through a tap hole 58. This ladle 55 is mounted on a carriage 56 running on rails and is brought below the tap hole 58.

The slag is removed through a lateral slag-removal door 61 by tilting the furnace 10 on its seating 54.

Figure 2:
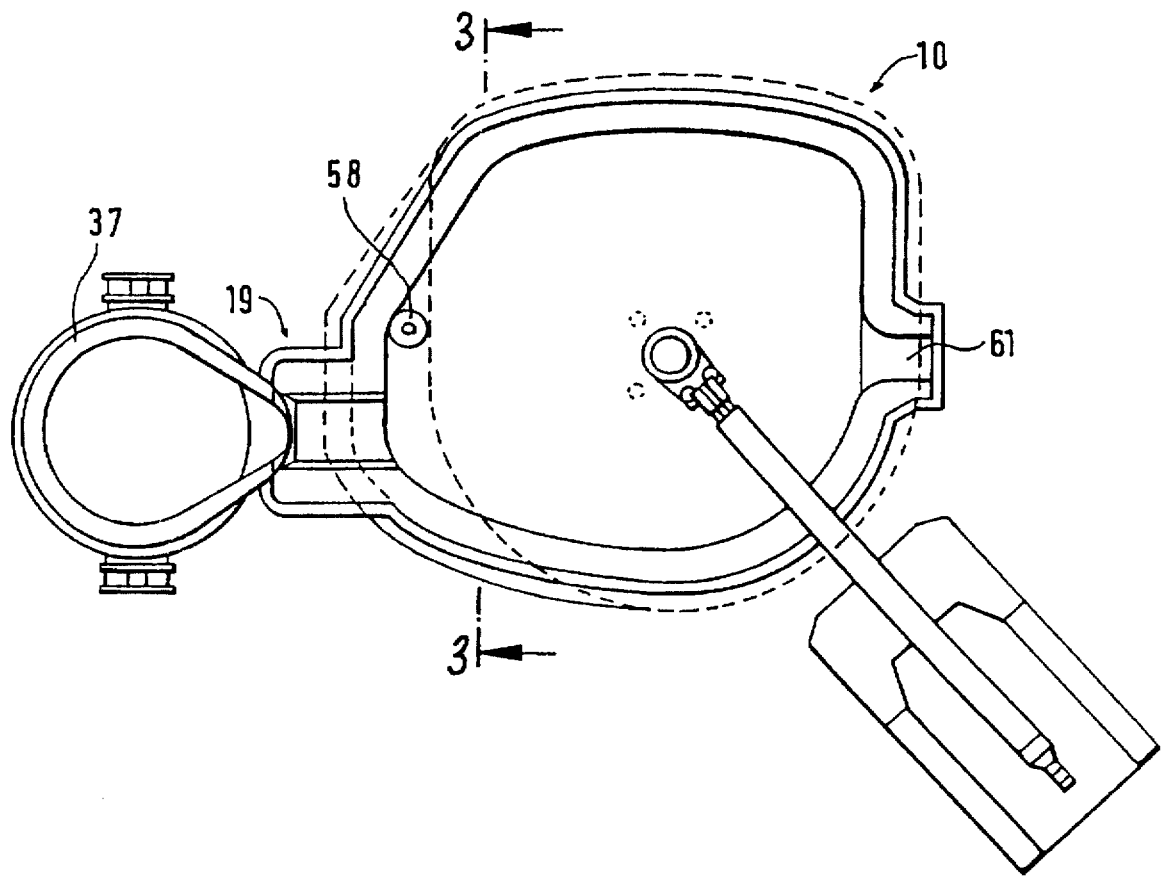
FIG. 2 shows a plan view of an electric furnace.

FIG. 2 shows a plan view of the furnace 10. The position of the lateral balcony 19 in relation to the tap hole 58 can be seen in this figure. The balcony is displaced laterally with respect to the tap hole 58 so as to prevent the liquid iron from being poured directly into the tap hole, but so as to make it flow towards the centre of the furnace 10 instead.

Figure 3:
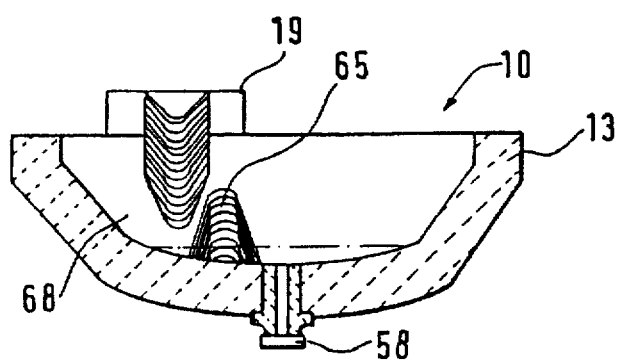
FIG. 3 represents a cross-section along the line III—III of FIG. 2.

FIG. 3; a cross-section along the line III–III' of FIG. 2, shows a mound 65 demarcating a flow channel 68 for the liquid iron.

Figure 4:
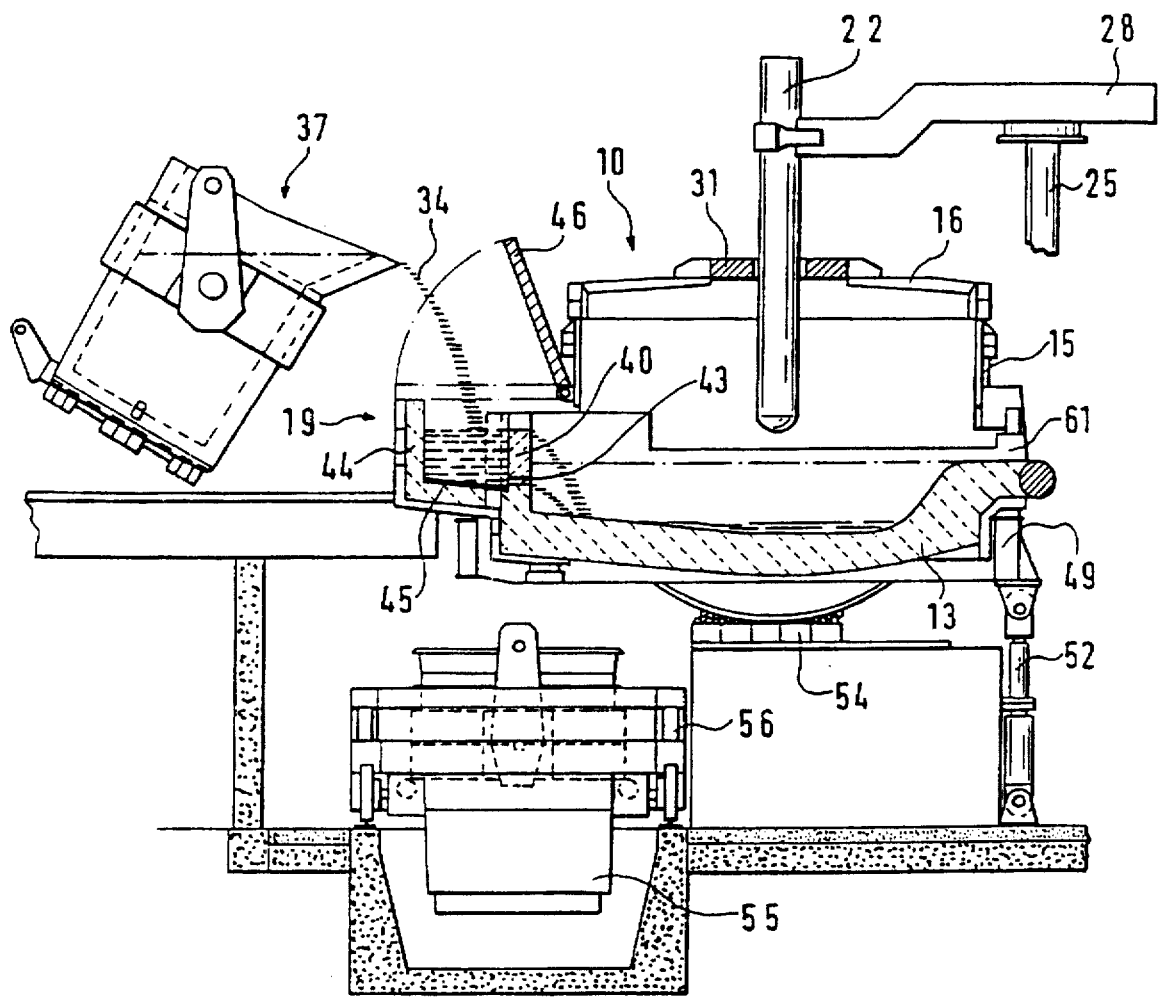
FIG. 4 represents a longitudinal cross-section through an electric furnace incorporating a charging device for liquid iron equipped with a barrier.

FIG. 4 represents a preferred embodiment in which the lateral balcony 19 is demarcated from the shaft of the furnace 10 by a barrier 40 which temporarily retains the iron 34. The balcony 19 is filled up to the height of the barrier 40 and the iron 34 is then thrown over the barrier 40 into the hearth 13. At the base of the barrier 40, one or more openings 43 are made which allow the balcony 19 to be emptied at the end of the charging with the iron 34. In order to maintain a pig bed in the balcony 19, it is sufficient to adjust the flow rate of the iron 34 supplied to the balcony 19 so that it is greater than the flow rate of the iron passing through the openings 43 made in the base of the barrier 40.

Figure 5:
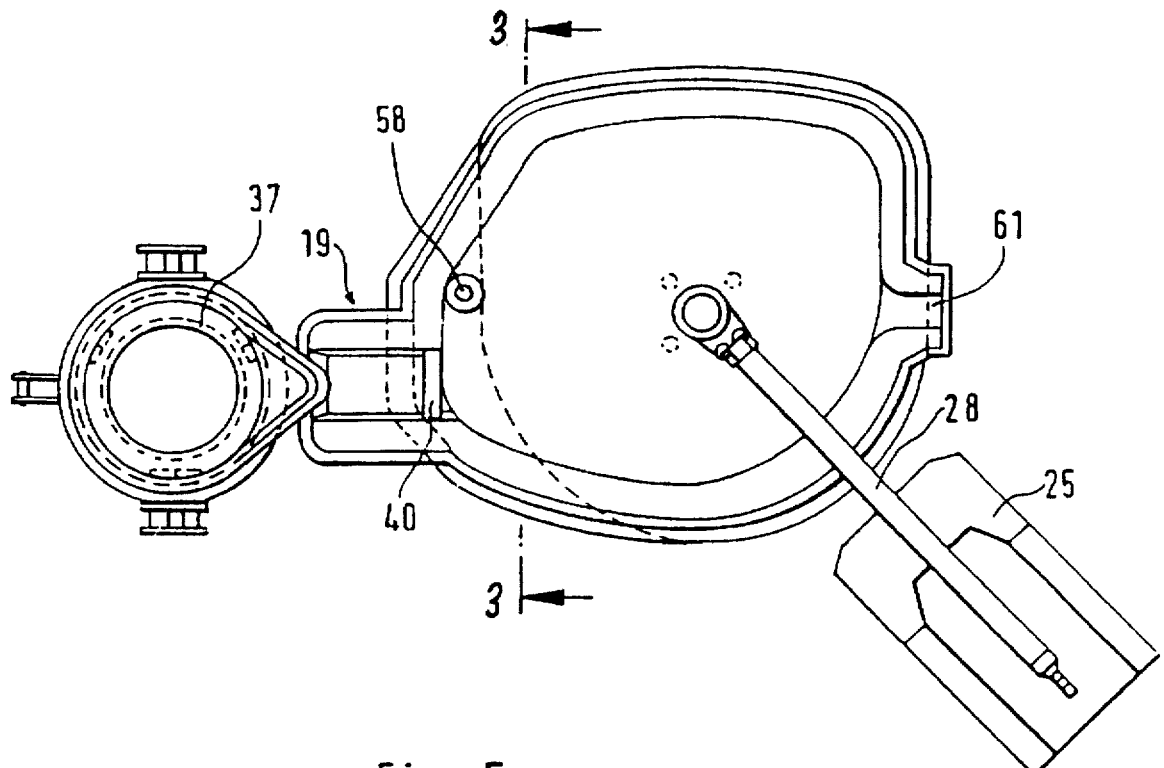
FIG. 5 represents a cross-section through the furnace of FIG. 4 at the level of the tap hole.

It can be seen in FIG. 5 that the barrier 40 is located in vertical slides 71, allowing it to be easily replaced when it is worn. The barrier 40 has two handles 76 by which it may be removed from the slides.

Figure 6:
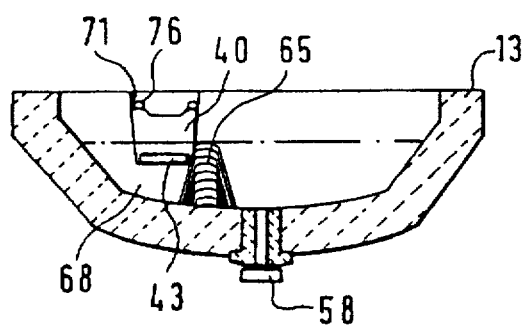
FIG. 6 represents a cross-section along the line III—III of FIG. 5.

FIG. 6, a cross-section along the line III–III' of FIG. 5, shows a mound 65 demarcating a flow channel 68 for the liquid iron. The barrier 40 is located in vertical slides 71, allowing it to be easily replaced when it is worn. The barrier 40 has two handles 76 by which it may be removed from the slides 71.

What is claimed:

1. Charging device for supplying the liquid metal to an electric furnace having a shaft (15), said device comprising a balcony (19) extending laterally from furnace shaft (15), said balcony (19) is a refractory material, a cover (46) equipped with a refractory coating located above said balcony (19), said cover (46) forming at an open position a protection shield for protecting a part of the furnace (10) adjacent to said device.

2. Device according to claim 1, wherein the bottom of the lateral balcony (19) is covered by an impact plate (45) made of a refractory material.

3. Device according to claim 1, wherein the device is positioned near a tap hole (58) of the furnace (10).

4. Device according to claim 1, wherein the balcony is demarcated from the shaft of the furnace by a barrier (40) designed so as to retain at least temporarily the molten metal and to provide a communication allowing the flow under gravity of at least a part of the molten metal poured into the balcony (19) towards the said shaft (15).

5. Device according to claim 4, wherein the barrier (40) is detachable.

6. Device according to claim 4, wherein at least one opening is made in the base of the barrier (40) in order to allow the balcony to be emptied.

7. Device according to claim 1, wherein a flow channel is formed and runs from the hearth of the balcony to the center of the furnace.

8. Device according to claim 7, further comprising a dam (65) positioned between the flow channel and the tap hole (58) of the furnace.

* * * * *